(12) United States Patent
Jung

(10) Patent No.: US 10,145,532 B2
(45) Date of Patent: Dec. 4, 2018

(54) LIGHT EMITTING DEVICE PACKAGE AND BACKLIGHT UNIT INCLUDING THE SAME

(71) Applicant: LG INNOTEK CO., LTD., Seoul (KR)

(72) Inventor: Jae Wook Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 405 days.

(21) Appl. No.: 14/945,943

(22) Filed: Nov. 19, 2015

(65) Prior Publication Data

US 2016/0138778 A1    May 19, 2016

(30) Foreign Application Priority Data

Nov. 19, 2014 (KR) .................. 10-2014-0161530

(51) Int. Cl.
```
F21V 5/04      (2006.01)
F21V 7/00      (2006.01)
G02B 19/00     (2006.01)
F21Y 115/10    (2016.01)
```

(52) U.S. Cl.
CPC .............. *F21V 5/04* (2013.01); *F21V 7/0091* (2013.01); *G02B 19/0061* (2013.01); *F21Y 2115/10* (2016.08)

(58) Field of Classification Search
CPC ...... F21V 5/04; F21V 7/0091; G02B 19/0061
See application file for complete search history.

(56) References Cited

U.S. PATENT DOCUMENTS

| | | | |
|---|---|---|---|
| 7,843,654 B2 * | 11/2010 | Destain .................... | G02B 3/10 359/793 |
| 9,170,001 B2 * | 10/2015 | Schenkl ................ | D06F 37/266 |
| 9,267,667 B2 * | 2/2016 | Jiang .......................... | F21V 5/04 |
| 2004/0012976 A1 * | 1/2004 | Amano ................. | F21V 7/0091 362/511 |
| 2006/0083016 A1 * | 4/2006 | Okamura ............. | B60Q 1/0052 362/545 |
| 2011/0096553 A1 * | 4/2011 | Shimokawa .............. | F21V 5/04 362/311.02 |
| 2011/0210368 A1 | 9/2011 | Jeong et al. | |
| 2014/0204588 A1 * | 7/2014 | Ha ........................... | F21K 9/50 362/308 |

FOREIGN PATENT DOCUMENTS

| | | |
|---|---|---|
| CN | 102297361 A | 12/2011 |
| CN | 102696123 A | 9/2012 |
| JP | 2013127606 A | 6/2013 |
| KR | 20100029577 A | 3/2010 |

OTHER PUBLICATIONS

Office Action dated Sep. 4, 2018 in Chinese Application No. 201510809443.X, with its English Translation.

* cited by examiner

*Primary Examiner* — Anabel Ton
(74) *Attorney, Agent, or Firm* — Saliwanchik, Lloyd & Eisenschenk

(57) ABSTRACT

A light emitting device package is disclosed. The light emitting device package includes a light source, a lens located on the light source, and a pattern unit located on the lens, wherein the lens includes a body having a first lower surface facing the light source and a protrusion protruding from the body in a direction other than a direction of optical axis, and the pattern unit is located on at least one selected from among at least a portion of a surface of the protrusion and a first side surface of the body.

16 Claims, 19 Drawing Sheets

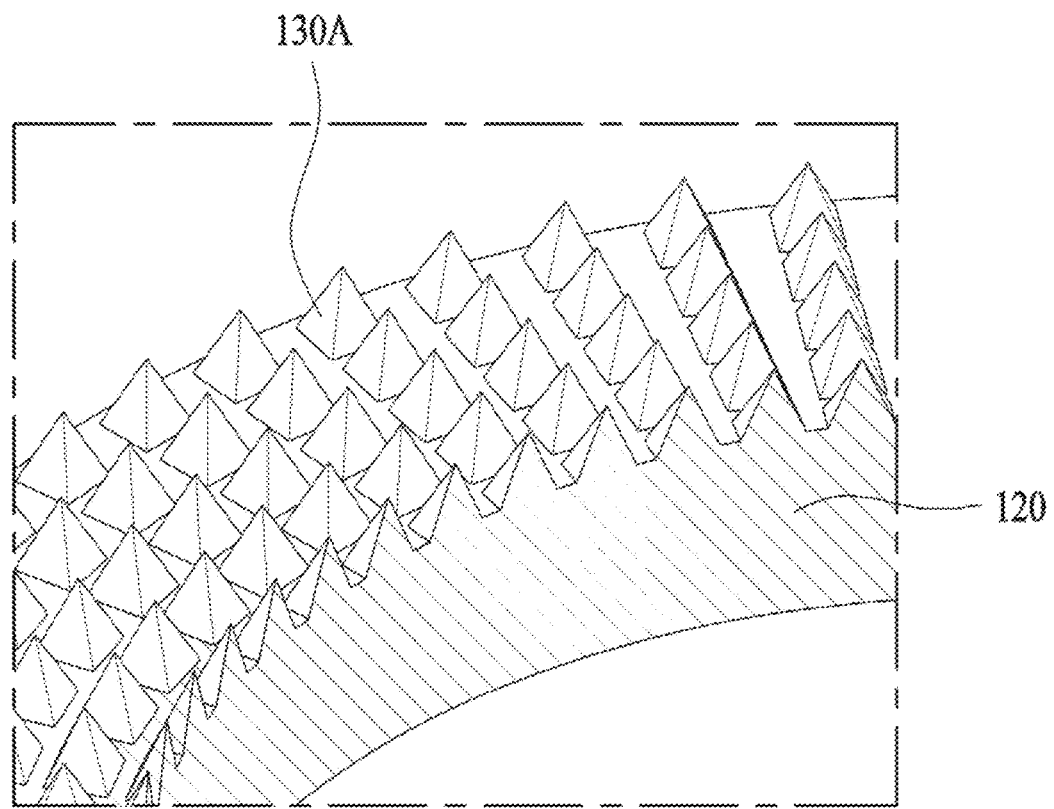

LIGHT EMITTING DEVICE PACKAGE AND BACKLIGHT UNIT INCLUDING THE SAME

CROSS REFERENCE TO RELATED APPLICATION

This application claims priority under 35 U.S.C. § 119 to Korean Application No 10-2014-0161530, filed on Nov. 19, 2014, which is hereby incorporated by reference in its entirety.

TECHNICAL FIELD

Embodiments relate to a light emitting device package and a backlight unit including the same.

BACKGROUND

A light emitting diode (LED) is a kind of semiconductor device that converts electricity into light for example infrared light, which is used as a light source, for signal transmission and reception, using the characteristics of a compound semiconductor.

A group III-V nitride semiconductor has been widely used as a core material for light emitting devices, such as light emitting diodes (LEDs) or laser diodes (LDs), thanks to the physical and chemical properties thereof.

LEDs do not contain any material that causes environmental pollution, such as mercury (Hg), which is used in conventional lighting apparatuses such as incandescent lamps and fluorescent lamps. Consequently, LEDs exhibit excellent environment-friendly characteristics. In addition, LEDs are characterized by a long lifespan and low power consumption. For these reasons, LEDs have replaced conventional light sources.

In a conventional light emitting device package including a light emitting device and a lens located on the light emitting device, the upper edge of the lens is dark, whereby illuminance on a target illuminance surface is non-uniform.

BRIEF SUMMARY

Embodiments provide a light emitting device package that exhibits uniform illuminance, and a backlight unit including the same.

In one embodiment, a light emitting device package includes a light source, a lens located on the light source, and a pattern unit located on the lens, wherein the lens includes a body having a first lower surface facing the light source and a protrusion protruding from the body in a direction other than a direction of optical axis, and the pattern unit is located on at least one selected from among at least a portion of the surface of the protrusion and a first side surface of the body.

For example, the lens may further include a recess formed at a first upper surface of the body, the recess being located along the optical axis, and the pattern unit may be located outside the recess.

For example, the recess may have at least one selected from among a curved surface and a flat surface. The recess may be configured such that the sectional shape of the recess is symmetric with respect to the optical axis.

For example, the protrusion may include a second upper surface located around the first upper surface, a second lower surface opposite to the second upper surface, and a second side surface located between the second upper surface and the second lower surface, and the pattern unit may be located on at least one selected from among the second upper surface, the first side surface, the second side surface, and the second lower surface.

For example, the body of the lens may further include a third upper surface located between the protrusion and the first upper surface.

For example, the pattern unit may be located on at least one selected from among the second upper surface, the third upper surface, the first side surface, the second side surface, the first lower surface, and the second lower surface.

For example, the protrusion may be located at the edge of the second upper surface For example, the pattern unit may be located on at least a portion of the second upper surface.

For example, a direction in which the protrusion protrudes may be perpendicular to the optical axis.

For example, the direction in which the protrusion protrudes may be identical to a direction in which the second upper surface extends from the third upper surface.

For example, the pattern unit may be integrally formed with the protrusion. Alternatively, the pattern unit may be formed separately from the protrusion.

For example, the light emitting device package may further include an adhesive unit for bonding the pattern unit to the protrusion.

For example, the protrusion and the pattern unit may be made of the same material.

For example, the protrusion and the pattern unit may be made of different materials.

For example, the lens may be configured such that the sectional shape of the lens is symmetric with respect to the optical axis in a direction perpendicular to the optical axis.

For example, the light source may be located to overlap the lens in the direction of optical axis.

For example, the pattern unit may be spaced apart from the recess in a direction perpendicular to the optical axis.

For example, the pattern unit may abut on the recess in a direction perpendicular to the optical axis.

For example, the protrusion may have a thickness greater than the width of the second lower surface.

For example, the pattern unit may have at least one selected from among a polyhedral shape, a composite cubic shape constituted by a plurality of polygons, a hemispherical shape, a roughness shape, and an irregular shape.

For example, the pattern unit may have a pyramidal shape, the pyramidal shape having an angle of inclination of 20 degrees to 80 degrees. The pattern unit may include a plurality of cubic bodies, spaced apart from each other by a distance of 0.1 mm to 1.1 mm.

In another embodiment, a light emitting device package includes a light source and a lens located on the light source, wherein the lens includes a recess located at the center of the upper part thereof and a ring-shaped upper surface surrounding the recess, the ring-shaped upper surface having a pattern.

In a further embodiment, a backlight unit includes the light emitting device package and an optical member located on the light emitting device package.

BRIEF DESCRIPTION OF THE DRAWINGS

Arrangements and embodiments may be described in detail with reference to the following drawings in which like reference numerals refer to like elements and wherein:

FIGS. 7A to 7F are perspective views showing embodiments of a pattern unit;

DETAILED DESCRIPTION

Figure 1:
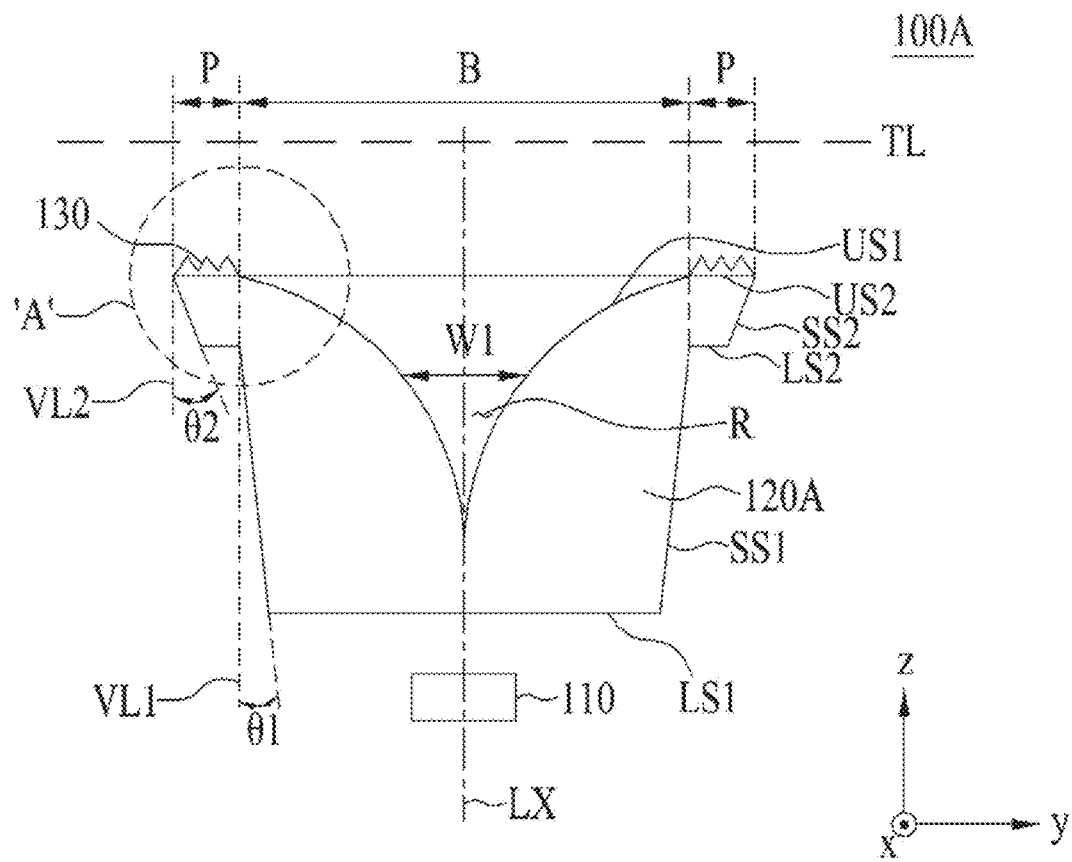
FIG. 1 is a sectional view showing a light emitting device package according to an embodiment.

Reference will now be made in detail to the preferred embodiments, examples of which are illustrated in the accompanying drawings. However, embodiments may be modified into various other forms. Embodiments are not restrictive but are illustrative. Embodiments are provided to more completely explain the disclosure to a person having ordinary skill in the art.

It will be understood that when an element is referred to as being 'on' or 'under' another element, it can be directly on/under the element, and one or more intervening elements may also be present. When an element is referred to as being 'on' or 'under', 'under the element' as well as 'on the element' can be included based on the element.

In addition, relational terms, such as 'first' and 'second' and 'upper part' and 'lower part', are used only to distinguish between one subject or element and another subject and element without necessarily requiring or involving any physical or logical relationship or sequence between such subjects or elements.

In the drawings, the thicknesses or sizes of respective layers (or respective parts) are exaggerated, omitted, or schematically illustrated for convenience and clarity of description. Further, the sizes of the respective elements do not denote the actual sizes thereof.

Hereinafter, light emitting device packages 100A and 100B and a backlight unit 200 according to embodiments will be described with reference to the accompanying drawings. For the sake of convenience, the light emitting device packages 100A and 100B, and the backlight unit 200 will be described using a Cartesian coordinate system (x-axis, y-axis, z-axis). However, other different coordinate systems may be used. In the Cartesian coordinate system, the x-axis, the y-axis, and the z-axis are perpendicular to one another. However, the disclosure is not limited thereto. That is, the x-axis, the y-axis, and the z-axis may intersect one another without being perpendicular to one another.

Figure 2:
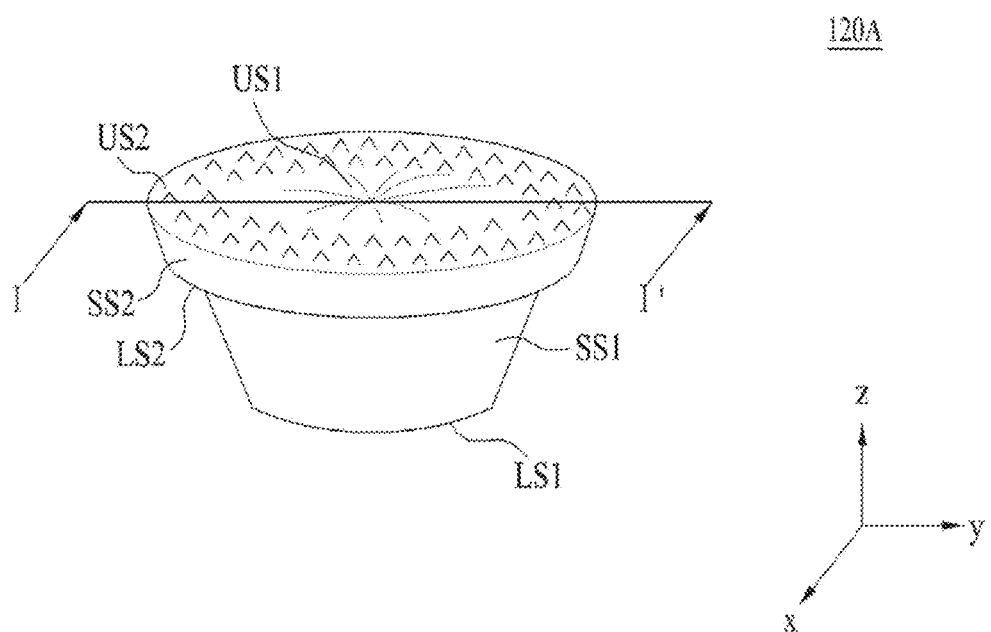
FIG. 2 is a perspective view showing an embodiment of a lens shown in FIG. 1.
Figure 3:
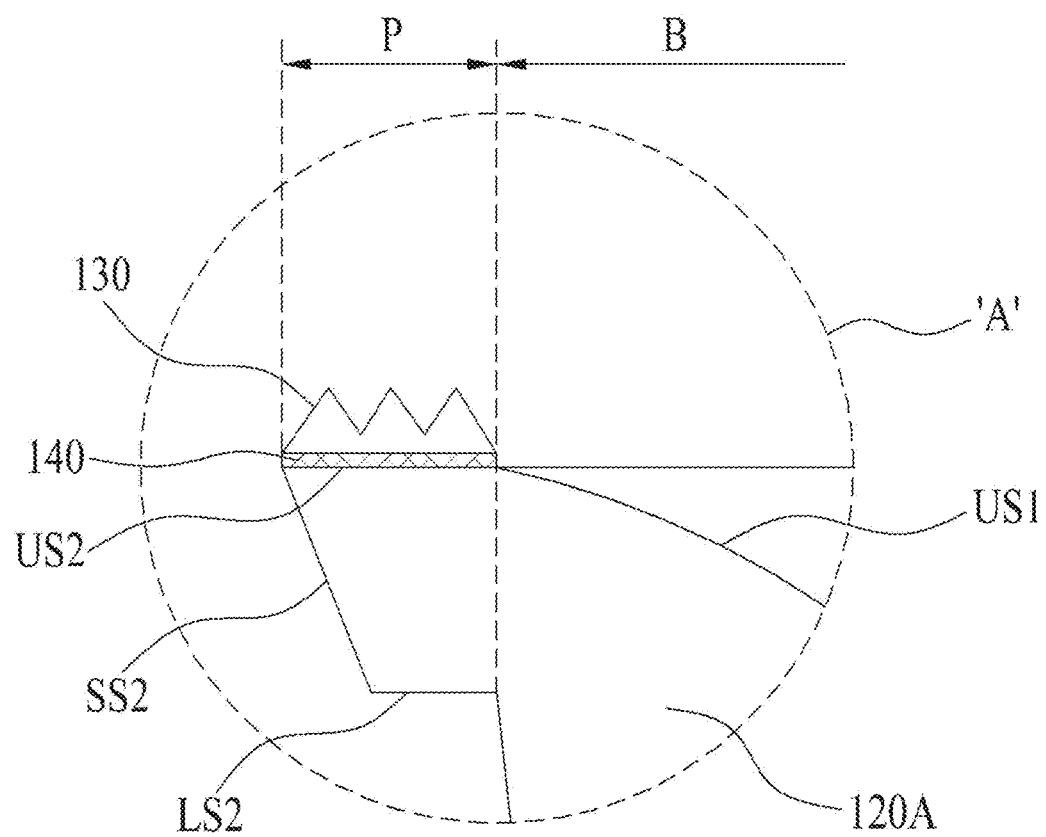
FIG. 3 is a partially enlarged sectional view showing an embodiment of part 'A' shown in FIG. 1.

FIG. 1 is a sectional view showing a light emitting device package 100A according to an embodiment, FIG. 2 is a perspective view showing an embodiment of a lens 120A shown in FIG. 1, and FIG. 3 is a partially enlarged sectional view showing an embodiment of part 'A' shown in FIG. 1.

FIG. 1 is a sectional view of the lens 120A taken along line I-I' of FIG. 2. However, the disclosure is not limited thereto. That is, the lens 120A shown in FIG. 1 may have shapes other than that shown in FIG. 2.

Referring to FIG. 1, the light emitting device package 100A may include a light source 110, a lens 120A, a pattern unit 130, and an adhesive unit 140.

The light source 110 may be a light emitting diode (LED) chip. The LED chip may be a blue LED chip or an ultraviolet LED chip. Alternatively, the LED chip may be at least one selected from a red LED chip, a green LED chip, a blue LED chip, a yellow green LED chip, and a white LED chip or a combination thereof.

A white LED may be embodied by applying a yellow phosphor to a blue LED, by simultaneously applying a red phosphor and a green phosphor to a blue LED, or by simultaneously applying a yellow phosphor, a red phosphor, and a green phosphor to a blue LED. Although not shown, the light source 110 may be located on a board (not shown).

The light source 110 may be disposed to overlap the lens 120A in a direction of optical axis LX (i.e. a z-axis direction). However, the disclosure is not limited thereto. The light source 110 may be a top view type light emitting diode. Alternatively, the light source 110 may be a side view type light emitting diode.

Meanwhile, the lens 120A may be located on the light source 110, and may include a body B and a protrusion P.

The body B may include a first lower surface LS1, a first side surface SS1, and a first upper surface US1.

Figure 11:
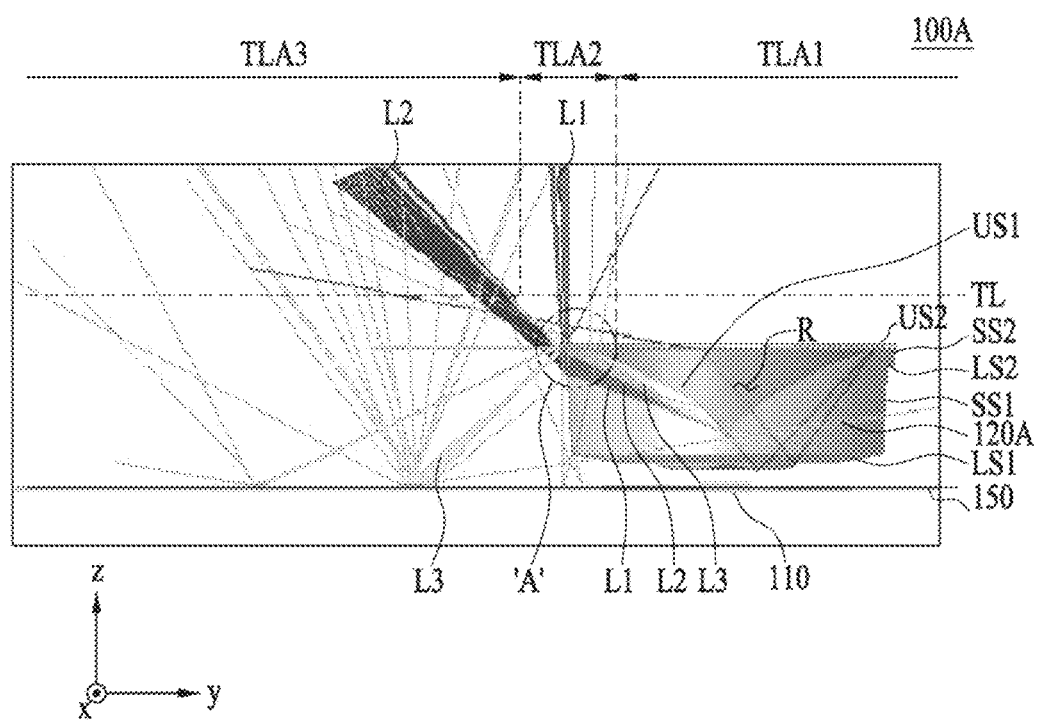
FIG. 11 is a sectional view showing the light emitting device package according to the embodiment.

The first lower surface LS1 is a surface which faces the light source 110 and upon which light emitted from the light source 110 is incident. In FIG. 1, the first lower surface LS1 is shown as an example as being flat. However, the disclosure is not limited to a shape of the first lower surface LS1. In another embodiment, the body B may be provided at the lower part thereof with a recess (not shown) for receiving at least a portion of the light source 110. That is, the recess may be formed at the first lower surface LS1. Alternatively, as shown in FIG. 11, the first lower surface LS1 may be convex toward the light source 110.

The first side surface SS1 may be adjacent to the protrusion P. In a case in which the protrusion P is located at the upper part among the upper, middle, and lower parts of the body B, as shown in FIG. 1, the first side surface SS1 may be located under the protrusion P. The first side surface SS1 may be inclined from a virtual perpendicular line VL1 parallel to the optical axis LX by a first angle θ1. For example, the first angle θ1 may be greater than −90 degrees and less than 90 degrees. However, the disclosure is not limited thereto.

The first upper surface US1 may be a surface on which a recess R is formed. The recess R may be located at the center of the upper part of the lens 120A. As shown in FIG. 1, the recess R may be located along the optical axis LX. However, the disclosure is not limited thereto. The recess R may be gradually concave toward the first lower surface LS1. In addition, the sectional shape of the recess R may be symmetric with respect to the optical axis LX in a y-axis direction.

Meanwhile, the protrusion P may protrude from the body B in a direction other than the direction of optical axis LX. The protrusion P may protrude in a direction (e.g. the y-axis direction, which is perpendicular to the direction of optical axis LX) intersecting the direction of optical axis LX, i.e. the z-axis direction. However, the disclosure is not limited thereto.

Referring to FIGS. 1 and 3, the protrusion P may include a second upper surface US2, a second side surface SS2, and a second lower surface LS2.

As shown as an example in FIG. 2, the second upper surface US2 may be located around the first upper surface US1 of the body B. That is, the second upper surface US2 may have a ring-shaped planar shape surrounding the recess R. The second upper surface US2 may be the uppermost surface of the lens 120A from which light exits. However, the disclosure is not limited thereto.

For example, as shown in FIGS. 1 and 3, the second upper surface US2 may extend from the first upper surface US1 in a direction (e.g. the y-axis direction, which is perpendicular to the direction of optical axis LX) intersecting the direction of optical axis LX. That is, the second upper surface US2 may be adjacent to the first upper surface US1.

The second lower surface LS2 of the protrusion P may be opposite to the second upper surface US2. For example, the second lower surface LS2 may extend from the first side surface SS1 in a direction (e.g. the y-axis direction, which is perpendicular to the direction of optical axis LX) intersecting the direction of optical axis LX.

The second side surface SS2 may be located between the second upper surface US2 and the second lower surface LS2. For example, the second side surface SS2 may be inclined from a virtual perpendicular line VL2 parallel to the optical axis LX by a second angle θ2. For example, the second angle θ2 may be greater than −90 degrees and less than 90 degrees. However, the disclosure is not limited thereto.

In addition, the sectional shape of the lens 120A may be symmetric with respect to the optical axis LX in a direction (e.g. at least one of the y-axis or x-axis directions, which are perpendicular to the direction of optical axis LX) intersecting the direction of optical axis LX, i.e. the z-axis direction.

Meanwhile, in this embodiment, the pattern unit 130 may be located on the lens 120A. The pattern unit 130 may be located on at least a portion of the surface of the protrusion P or of the first side surface SS1 of the body B. That is, the pattern unit 130 may be located on at least one selected from among the second upper surface US2, the first side surface SS1, the second side surface SS2, and the second lower surface LS2.

For example, as shown in FIGS. 1 to 3, the pattern unit 130 may be located on the second upper surface US2 of the protrusion P. In this case, the pattern unit 130 may be located outside the recess R (i.e. the first upper surface US1). In a case in which the recess R is located at the central part of the lens 120A, the pattern unit 130 may be located outside the recess R while surrounding the central part of the lens 120A.

Figure 4:
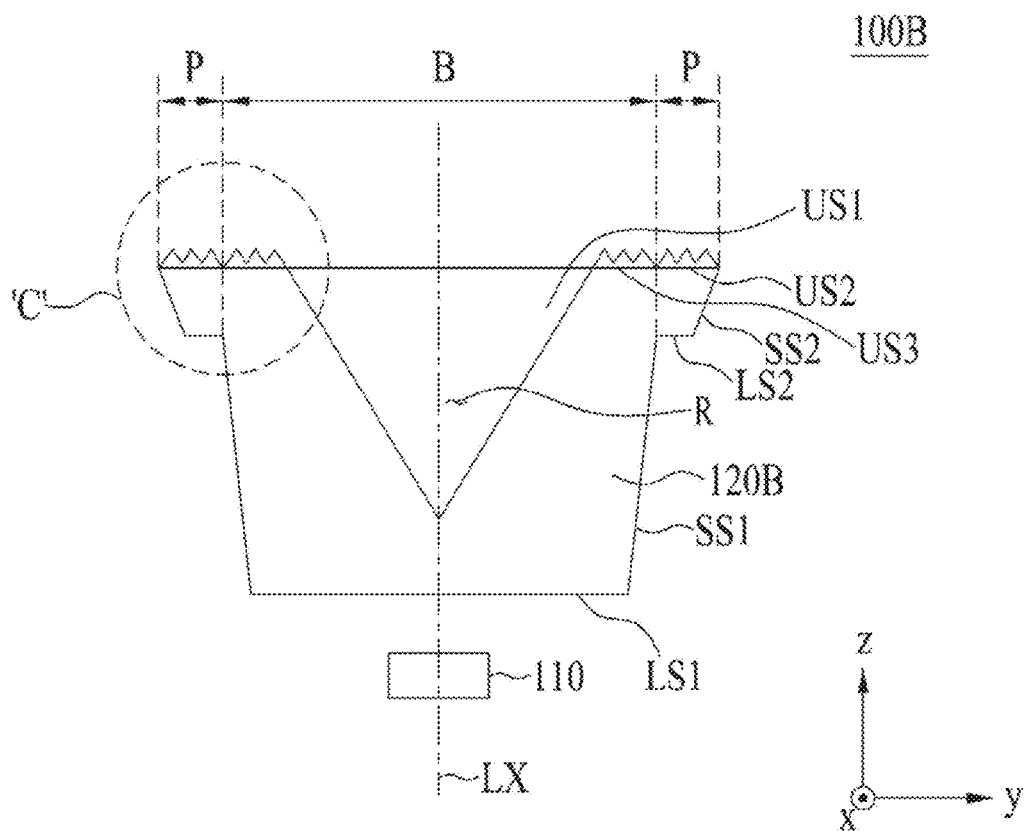
FIG. 4 is a sectional view showing a light emitting device package according to another embodiment.
Figure 5:
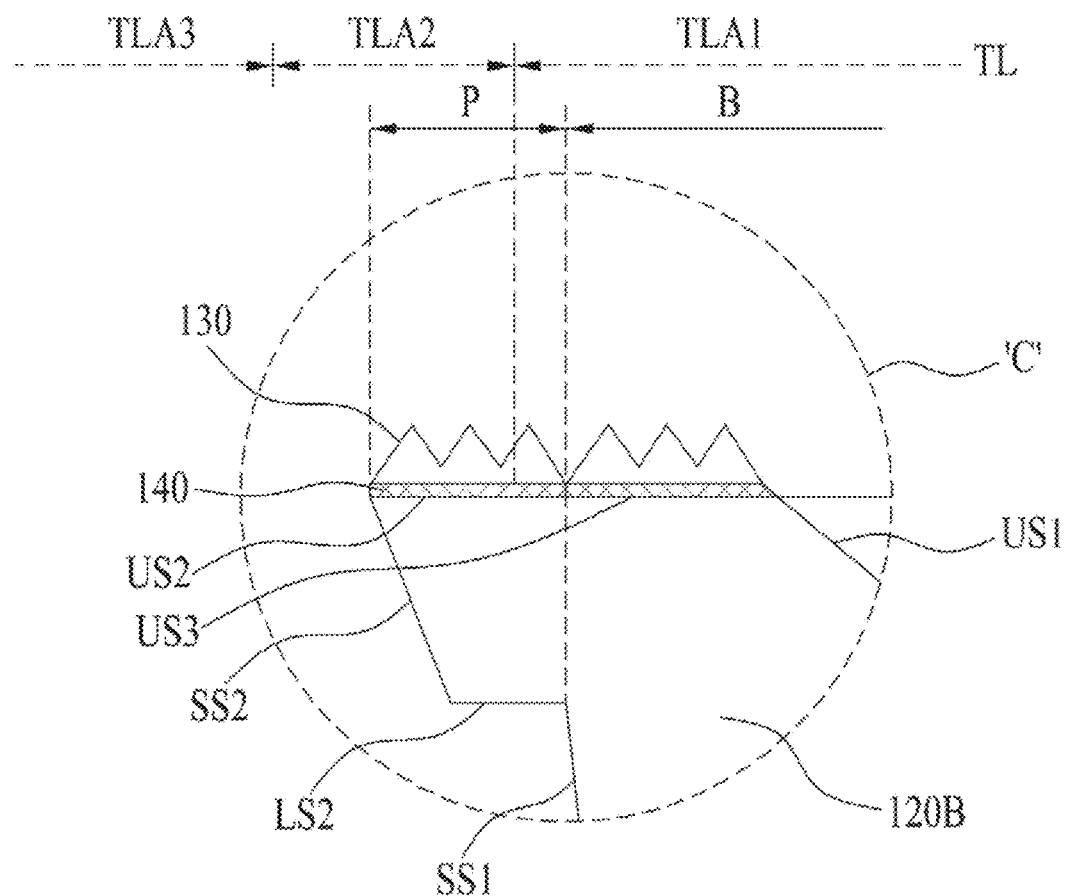
FIG. 5 is a partially enlarged sectional view showing part 'C' shown in FIG. 4.

FIG. 4 is a sectional view showing a light emitting device package 100B according to another embodiment, and FIG. 5 is a partially enlarged sectional view showing part 'C' shown in FIG. 4.

In addition, the recess R may have at least one of a curved surface or a flat surface.

In an embodiment, as shown in FIG. 1, the recess R may be curved. That is, a first width W1 of the recess R in a direction (e.g. the y-axis direction, which is perpendicular to the optical axis LX) intersecting the optical axis LX may gradually decrease toward the light source 110 in the direction of optical axis LX.

In another embodiment, as shown in FIG. 4, the recess R, which is defined by a first upper surface US1 of a lens 120B, may be flat instead of curved.

In a further embodiment, although not shown, the recess R may include a combination of a curved surface as shown in FIG. 1 and a flat surface as shown in FIG. 4.

The curved surface and the flat surface defining the recess R may be inclined surfaces.

Referring to FIGS. 1 and 3, the first upper surface US1 of the lens 120A may directly abut on the second upper surface US2. Alternatively, referring to FIGS. 4 and 5, a body B of the lens 120B may further include a third upper surface US3. In this case, the third upper surface US3 may be located between the protrusion P and the first upper surface US1. As shown, the third upper surface US3 may extend from the first upper surface US1 to the second upper surface US2 in a direction (e.g. the y-axis direction, which is perpendicular to the direction of optical axis LX) intersecting the direction of optical axis LX, i.e. the z-axis direction. That is, the second upper surface US2 may not extend from the first upper surface US1, at which the recess R is formed, but may extend from the third upper surface US3. For example, the second upper surface US2 of the protrusion P may extend from the third upper surface US3 in a direction (e.g. the y-axis direction, which is perpendicular to the direction of optical axis LX) intersecting the direction of optical axis LX, i.e. the z-axis direction.

In addition, a direction in which the protrusion P protrudes (e.g. the y-axis direction) and a direction (e.g. the y-axis direction) in which the second upper surface US2 extends from the third upper surface US3 may be the same as each other. However, the disclosure is not limited thereto.

In a case in which the body B further includes the third upper surface US3, as shown in FIGS. 4 and 5, the pattern unit 130 may be located on at least one selected from among the second upper surface US2, the third upper surface US3, the first side surface SS1, the second side surface SS2, and the second lower surface LS2. In addition, the pattern unit 130 may be formed on the first lower surface LS1.

As shown in FIGS. 1 to 3, the pattern unit 130 may be located over the entirety of the second upper surface US2. Alternatively, as shown in FIGS. 4 and 5, the pattern unit 130 may be located over the entirety of the second upper surface US2 and the third upper surface US3. However, the disclosure is not limited thereto. That is, unlike what is shown in FIGS. 1 to 5, the pattern unit 130 may be located on at least a portion of the second upper surface US2, may be located on at least a portion of the second upper surface US2 and at least a portion of the third upper surface US3, or may be located on at least a portion of the third upper surface US3.

Except for the differences described above, the light emitting device package 100B shown in FIGS. 4 and 5 is identical to the light emitting device package 100A shown in FIGS. 1 to 3, and therefore a repeated description thereof will be omitted.

In addition, as shown in FIGS. 1 to 5, the pattern unit 130 may abut on the recess R in a direction (e.g. the y-axis direction, which is perpendicular to the optical axis LX)

intersecting the optical axis LX. However, the disclosure is not limited thereto. That is, in another embodiment, although not shown, the pattern unit 130 may be spaced apart from the recess R in a direction (e.g. a direction perpendicular to the optical axis LX) intersecting the optical axis LX.

In addition, the pattern unit 130 may be located on the edge of the second upper surface US2. In addition, in a case in which the second upper surface US2 of the protrusion P has a ring-shaped planar shape surrounding the recess R, the pattern unit 130 may be located on the second upper surface US2 while having a planar shape surrounding the recess R.

Figure 6:
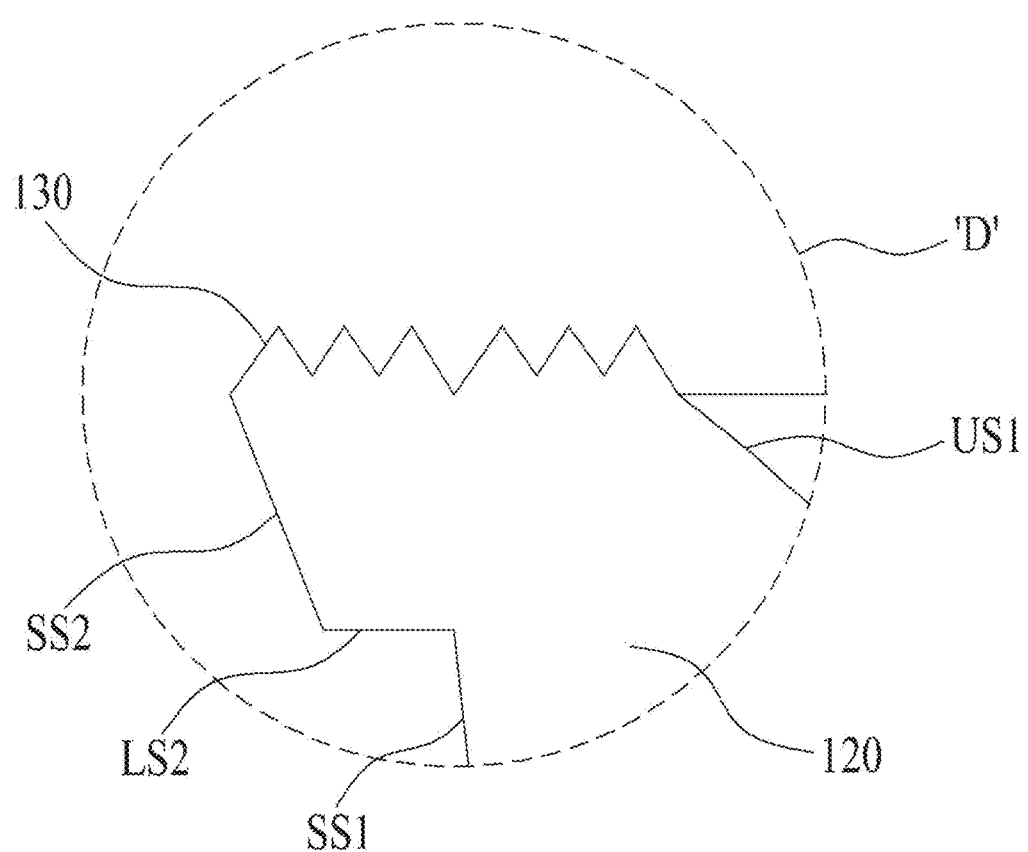
FIG. 6 is a partially enlarged sectional view showing another embodiment of part 'A' shown in FIG. 1 or part 'C' shown in FIG. 4.

FIG. 6 is a partially enlarged sectional view showing another embodiment D of part 'A' shown in FIG. 1 or part 'C' shown in FIG. 4. A lens denoted by reference numeral 120 corresponds to the lens 120A or 120B shown in FIG. 1 or 4.

In an embodiment, as shown in FIGS. 3 and 5, the pattern unit 130 may be separated from the protrusion P. In this case, the adhesive unit 140 may serve to bond the pattern unit 130 to the protrusion P. In addition, the pattern unit 130 and the protrusion P may be made of the same material or different materials. According to circumstances, the adhesive unit 140 may be omitted.

In another embodiment, as shown in FIG. 6, the pattern unit 130 may be integrally formed with the protrusion P. In this case, the pattern unit 130 and the protrusion P may be made of the same material, and the adhesive unit 140 may be omitted.

Meanwhile, the pattern unit 130 may have various shapes. The pattern unit 130 may have at least one selected from among a polyhedral shape, such as a quadrangular pyramid, including a plurality of surfaces, a composite cubic shape constituted by a plurality of polygons or polyhedra, a hemispherical shape, a roughness shape, and an irregular shape.

Hereinafter, the shape of the pattern unit 130 will be described in detail with reference to the accompanying drawings.

FIGS. 7A to 7F are perspective views showing embodiments 130A to 130F of the pattern unit 130.

A lens 120 shown in FIGS. 7A to 7F may be the lens 120A or 120B shown in FIG. 1, 2, 3, 4, or 5, and the pattern units 130A to 130F are embodiments of the pattern unit 130 shown in FIGS. 1 to 5.

Figure 7B:
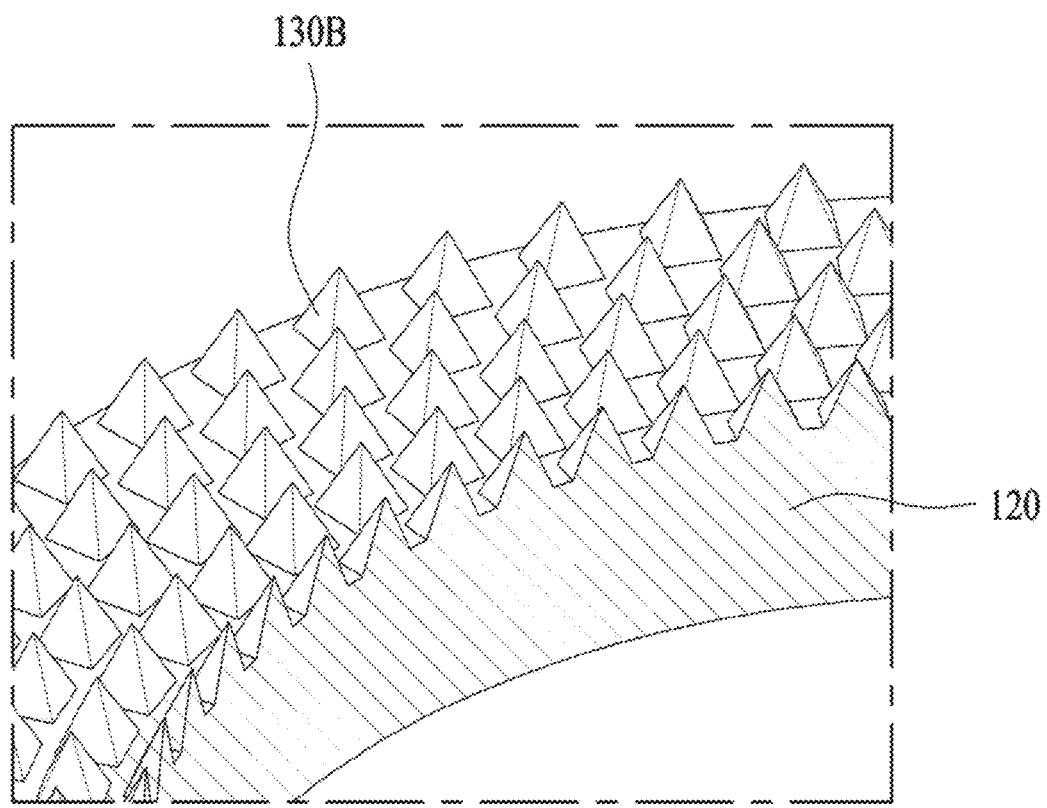
Figure 7C:
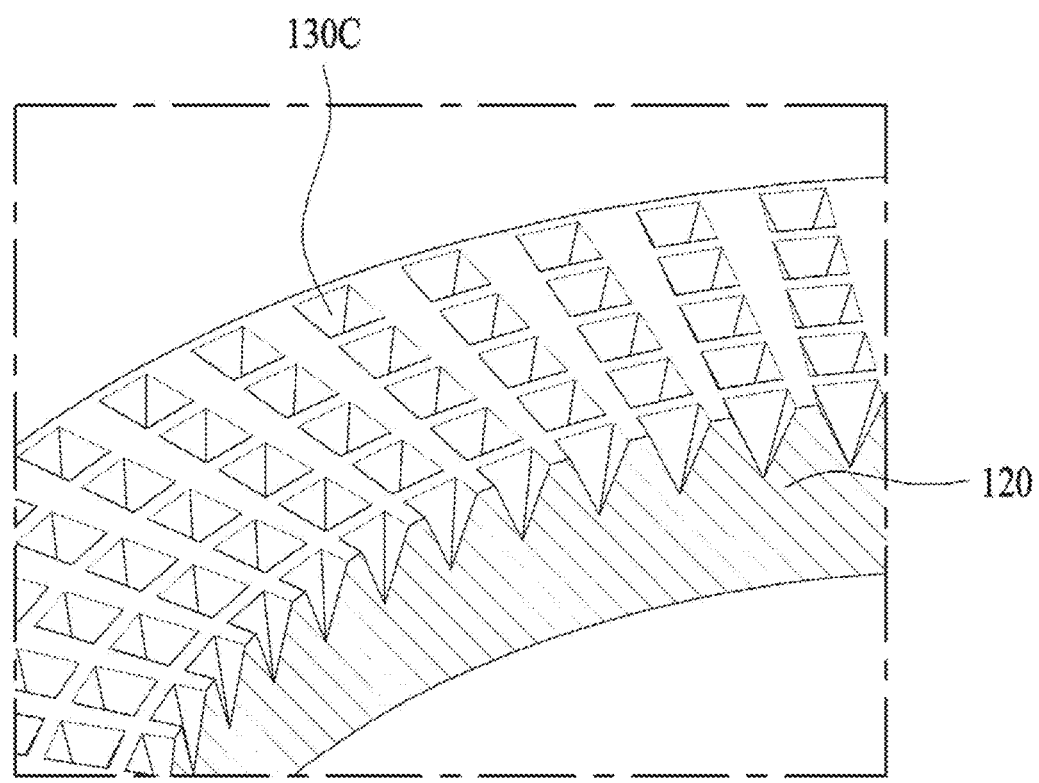
Figure 7D:
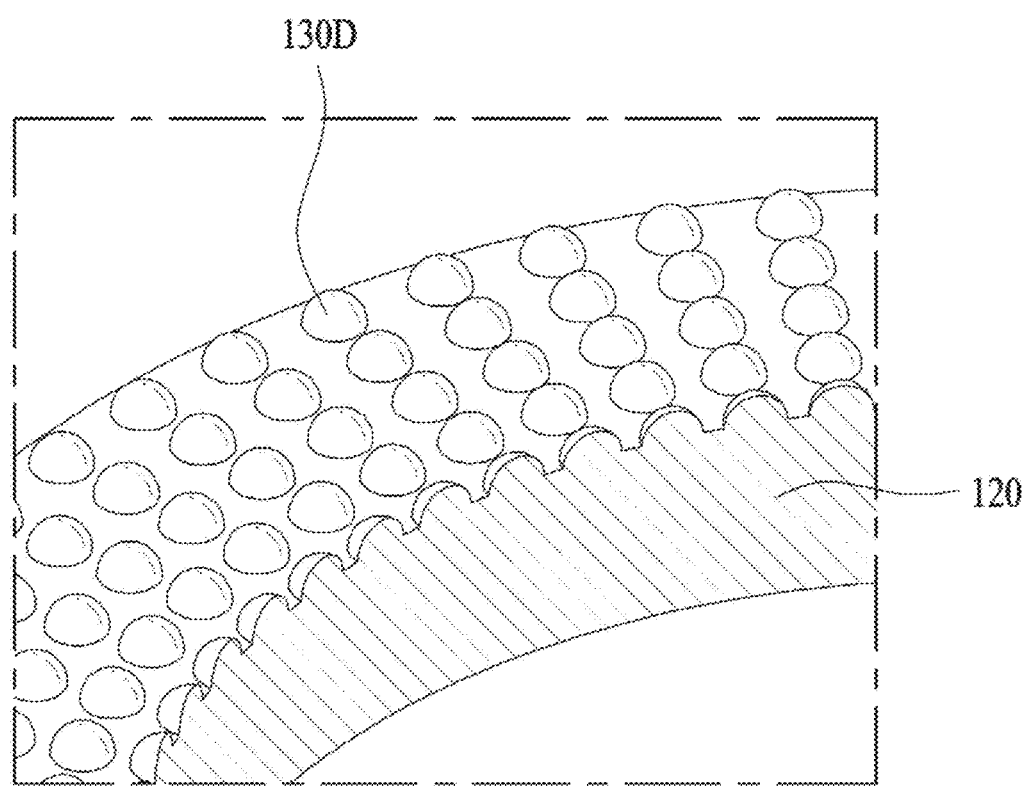
Figure 7E:
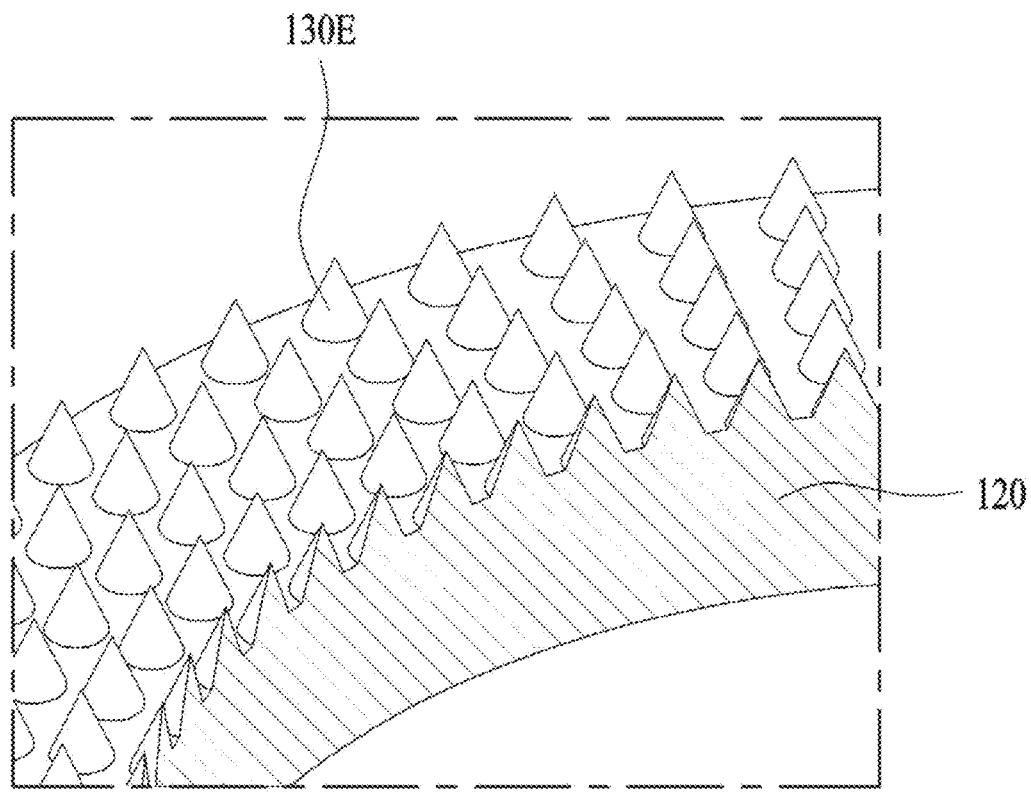
Figure 7F:
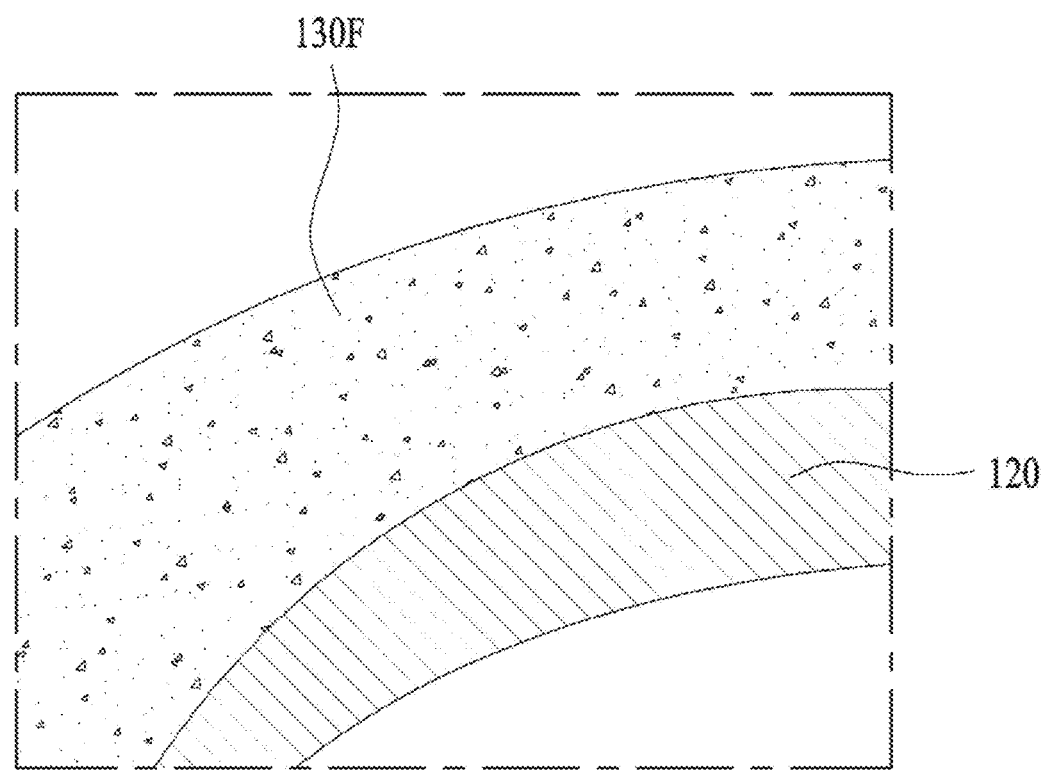

The pattern unit 130, located on the lens 120, may be a pyramid-bump type pattern unit 130A as shown in FIG. 7A, a pyramid-zigzag type pattern unit 130B as shown in FIG. 7B, a pyramid-hole type pattern unit 130C as shown in FIG. 7C, a hemispherical type pattern unit 130D as shown in FIG. 7D, a conical type pattern unit 130E as shown in FIG. 7E, or a pattern unit 130F having a roughness pattern or an irregular pattern formed by etching as shown in FIG. 7F.

Alternatively, the pattern unit 130 may have at least one of the shapes shown in FIG. 7A, 7B, 7C, 7D, 7E, or 7F. FIGS. 7A to 7F show only some embodiments of the pattern unit 130, and the disclosure is not limited thereto.

Figure 8:
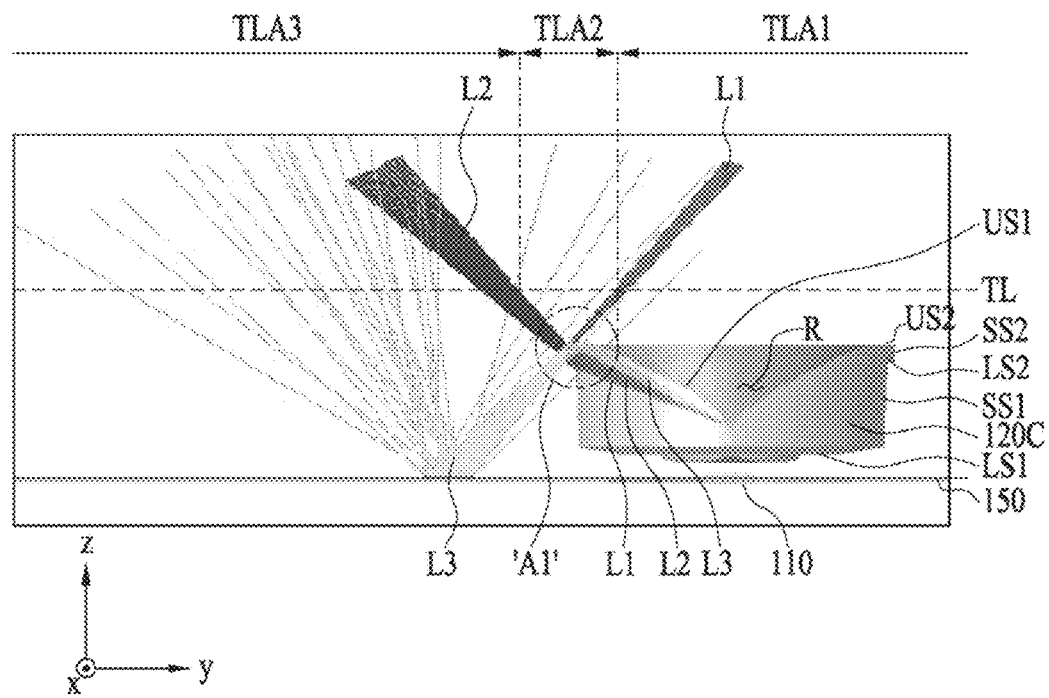
FIG. 8 is a sectional view showing a light emitting device package according to a comparative example.
Figure 9:
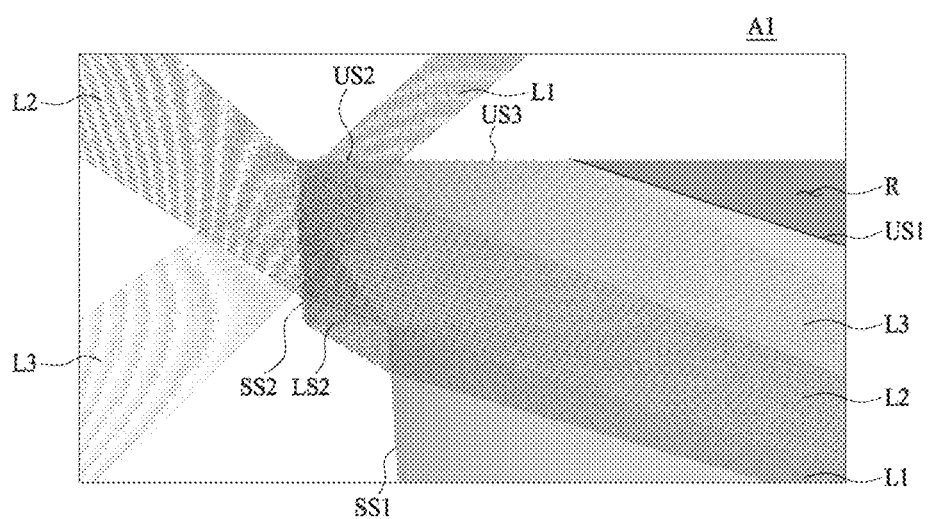
FIG. 9 is a partially enlarged sectional view showing part 'A1' shown in FIG. 8.

FIG. 8 is a sectional view showing a light emitting device package according to a comparative example, and FIG. 9 is a partially enlarged sectional view showing part 'A1' shown in FIG. 8.

Unlike the light emitting device package 100A according to the embodiment shown in FIGS. 1 to 3, the light emitting device package according to the comparative example shown in FIGS. 8 and 9 does not include a pattern unit 130, and a lens 120C further includes a third upper surface US3 in addition to a first upper surface US1. Except for the differences described above, the light emitting device package according to the comparative example shown in FIGS. 8 and 9 is identical to light emitting device package 100A shown in FIGS. 1 to 3, and therefore a repeated description thereof will be omitted.

First, light emitted from the light source 110 is incident upon the first lower surface LS1, and is then refracted by the first lower surface LS1. Subsequently, the light, refracted by the first lower surface LS1, is reflected by the first upper surface US1. The light, reflected by the first upper surface US1, advances to the protrusion P, and exits with being divided into first, second, and third light beams L1, L2, and L3 by the respective surfaces US2, SS2, and LS2 of the protrusion P. The first, second, and third light beams L1, L2, and L3 may reach a target illuminance surface TL. The first, second, and third light beams L1, L2, and L3 exit respectively to first, second, and third light beam exit areas TLA1, TLA2, and TLA3 through the target illuminance surface TL as follows.

Referring to FIGS. 8 and 9, the first light beam L1, reflected by the first upper surface US1, is refracted by the first side surface SS1, and then exits from the first side surface SS1. The light beam, exiting from the first side surface SS1, is incident upon the second lower surface LS2. The light beam, incident upon the second lower surface LS2, is refracted by the second lower surface LS2. Subsequently, the light beam, refracted by the second lower surface LS2, is total-reflected by the second side surface SS2, and is then incident upon the second and third upper surfaces US2 and US3. Subsequently, the first light beam L1 is refracted by the second and third upper surfaces US2 and US3, and then may exit to the first light beam exit area TLA1.

The second light beam L2 is refracted by the second side surface SS2, and then exits to the third light beam may exit area TLA3.

The third light beam L3 is total-reflected by the second and third upper surfaces US2 and US3, is refracted by the second side surface SS2, and then exits. In a case in which a lower reflection sheet 150 is located under the light source 110, light exiting from the second side surface SS2 is reflected and scattered by the lower reflection sheet 150. Most of the reflected and scattered light may advance to the third light beam exit area TLA3, and the remainder of the reflected and scattered light may advance to the first and second light beam exit areas TLA1 and TLA2. As shown in FIG. 8, the quantity of light advancing to the first and second light beam exit areas TLA1 and TLA2 is much less than the quantity of light advancing to the third light beam exit area TLA3.

The lower reflection sheet 150 may be made of at least one of a metal or a metal oxide. For example, the lower reflection sheet 150 may be made of a metal, such as aluminum (Al), silver (Ag), gold (Au), or titanium dioxide (TiO2) exhibiting high reflectance, or a metal oxide exhibiting high reflectance.

Figure 10:
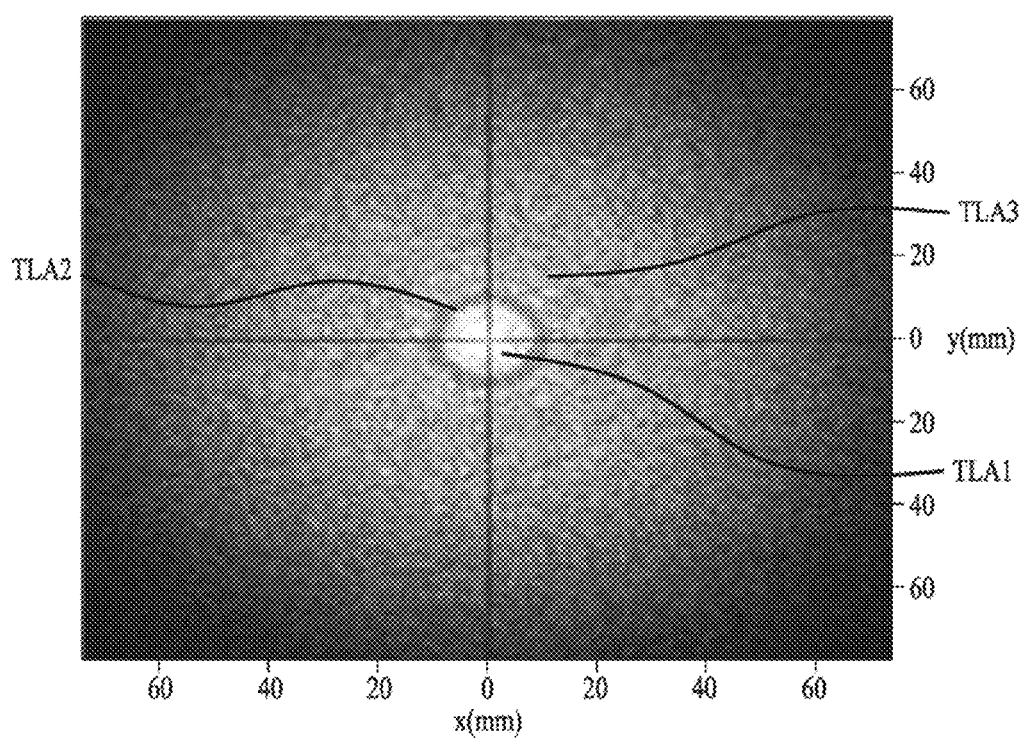
FIG. 10 is a photograph showing a state in which light is emitted upward from the light emitting device package shown in FIGS. 8 and 9.

FIG. 10 is a photograph showing a state in which light is emitted upward from the light emitting device package according to the comparative example shown in FIGS. 8 and 9. In FIG. 10, a horizontal axis indicates an x-axis, and a vertical axis indicates a y-axis.

In the above comparative example shown in FIGS. 8 and 9, the first and third light beam exit areas TLA1 and TLA3 on the target illuminance surface TL are bright as shown in FIG. 10. However, a dark band is formed in the second light beam exit area TLA2, which is between the first and third light beam exit areas TLA1 and TLA3. In a case in which the second light beam exit area TLA2 is dark, uniformity in light all over the target illuminance surface TL may be reduced.

In a case in which the light emitting device package is applied to a backlight unit 200, which will hereinafter be described, a center hot spot and non-uniform illuminance may occur at a position of the backlight unit at which the light emitting device package is located due to such a dark area.

Figure 12:
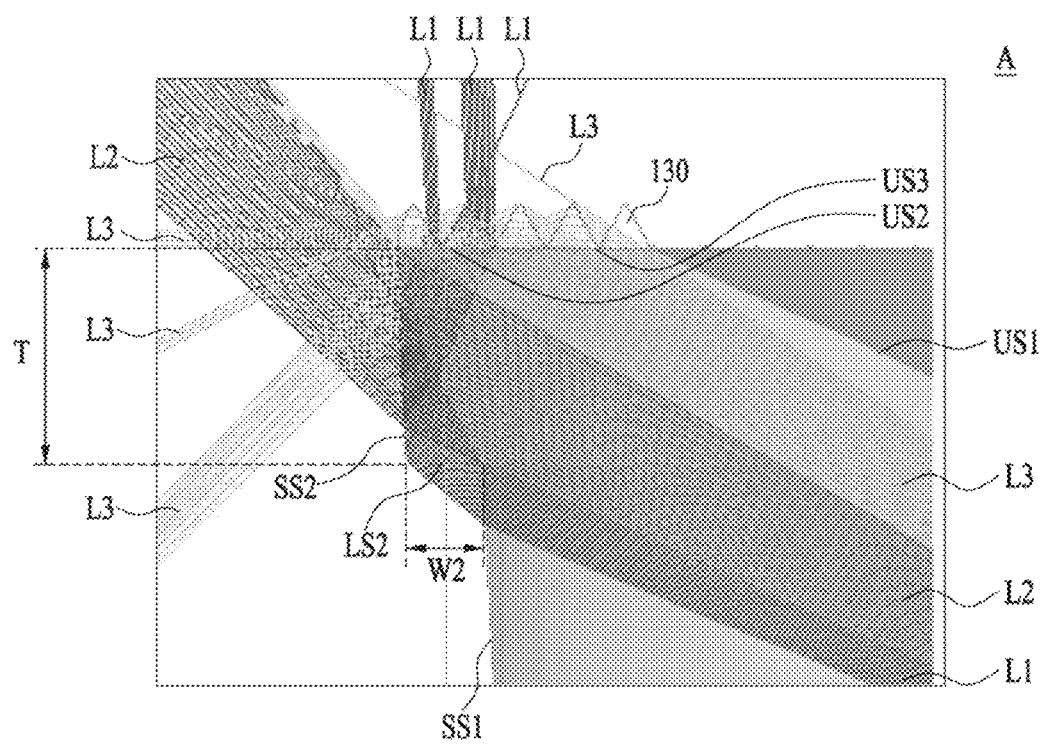
FIG. 12 is an enlarged sectional view showing part 'A' shown in FIG. 11.

FIG. 11 is a sectional view showing the light emitting device package 100A according to the embodiment, and FIG. 12 is an enlarged sectional view showing part 'A' shown in FIG. 11.

The light emitting device package 100A shown in FIG. 11 is identical to the light emitting device package 100A shown in FIG. 1, and part 'A' shown in FIG. 12 is identical to part 'A' shown in FIG. 5. However, FIGS. 11 and 12 additionally show a state in which first, second, and third light beams L1, L2, and L3 exit from the light emitting device package 100A shown in FIG. 1 or 5.

Referring to FIGS. 11 and 12, the first light beam L is refracted by the first side surface SS1, exits from the first side surface SS1, and is then incident upon the second lower surface LS2. The light beam, incident upon the second lower surface LS2, is refracted by the second lower surface LS2. The light beam, refracted by the second lower surface LS2, is total-reflected by the second side surface SS2, and is then incident upon the second and third upper surfaces US2 and US3. Subsequently, the first light beam L1 is reflected and scattered by the second and third upper surfaces US2 and US3, and then exits to the first and second light beam exit areas TLA1 and TLA2. In the light emitting device package 100A according to the embodiment shown in FIGS. 11 and 12, the pattern unit 130 is located on the second and third upper surfaces US2 and US3, unlike the light emitting device package according to the comparative example shown in FIGS. 8 and 9. Consequently, the optical path of the light beam which advances only to the first light beam exit area TLA1 if the pattern unit 130 is not disposed is changed by the pattern unit 130, whereby the light also exits to the second light beam exit area TLA2. As a result, illuminance (or luminance) on the target illuminance surface TL may become relatively more uniform than in the comparative example.

As previously described, the pattern unit 130 may be located on at least one selected from among the second upper surface US2, the third upper surface US3, the second lower surface LS2, the first side surface SS1, and the second side surface SS2. When the pattern unit 130 is located on at least one selected from between the second upper surface US2 and the third upper surface US3, illuminance may become more uniform than when the pattern unit 130 is located on the second lower surface LS2, the first side surface SS1, or the second side surface SS2.

Referring to FIG. 11, in order to increase the quantity of the first light beam L1 that is total-reflected by the second side surface SS2, a thickness T of the protrusion P may be greater than a second width W2 of the second lower surface LS2. However, the disclosure is not limited thereto.

Figure 13:
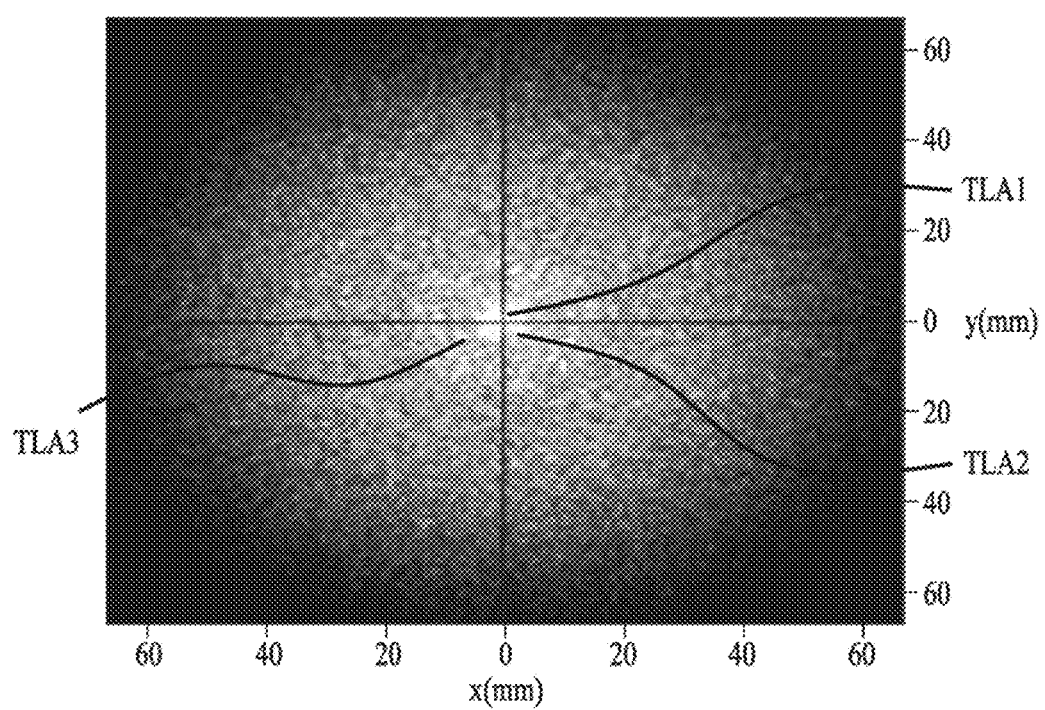
FIG. 13 is a photograph showing a state in which light is emitted upward from the light emitting device package shown in FIGS. 11 and 12.

FIG. 13 is a photograph showing a state in which light is emitted upward from the light emitting device package 100A according to the embodiment shown in FIGS. 11 and 12. In FIG. 13, a horizontal axis indicates an x-axis, and a vertical axis indicates a y-axis.

Referring to FIG. 13, the second light beam exit area TLA2, which is between the first and third light beam exit areas TLA1 and TLA3, is not dark, unlike the photograph of FIG. 10 showing a state in which the second light beam exit area TLA2 is dark. This is because the optical path of the first light beam L1 is changed by the pattern unit 130, and therefore the first light beam L1 exits to the second light beam exit area TLA2.

Referring back to FIGS. 11 and 12, the second light beam L2 is refracted by the second side surface SS2, and then exits to the third light beam exit area TLA3. That is, the optical path of the second light beam L2 is not changed by the pattern unit 130.

In addition, the third light beam L3 may be total-reflected by the second and third upper surfaces US2 and US3, may be refracted by the second side surface SS2, and may then exit. In a case in which a lower reflection sheet 150 is located under the lens 120A, as previously described, light exiting from the second side surface SS2 is reflected and scattered by the lower reflection sheet 150. Most of the reflected and scattered light may advance to the third light beam exit area TLA3, and the remainder of the reflected and scattered light may evenly advance to the first and second light beam exit areas TLA1 and TLA2. It is appreciated that the quantity of light advancing to the first and second light beam exit areas TLA1 and TLA2 is much less than the quantity of light advancing to the third light beam exit area TLA3.

As the pattern unit 130 is located as previously described, light may also exit to the second light beam exit area TLA2. Consequently, which of the second and third upper surfaces US2 and US3 the pattern unit 130 is located on may be decided based on whether light is also able to exit to the second light beam exit area TLA2.

Hereinafter, the change in illuminance on the target illuminance surface TL based on the shape of the pattern unit 130 will be described.

Figure 14:
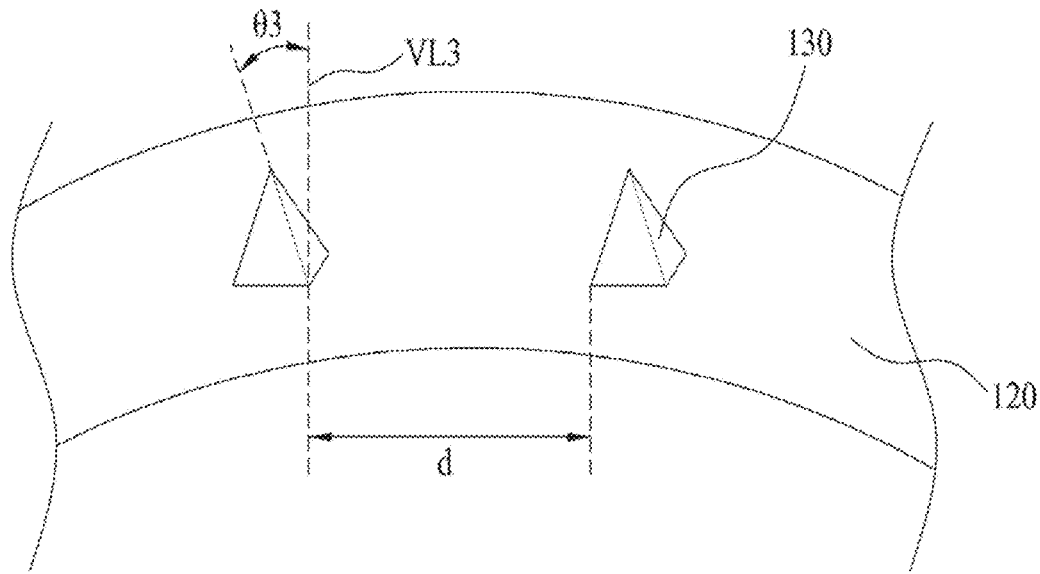
FIG. 14 is an enlarged perspective view showing an example of the pattern unit.

FIG. 14 is an enlarged perspective view showing an example of the pattern unit 130.

The pattern unit 130 shown in FIG. 14 has a pyramidal shape. That is, the pattern unit 130 has a quadrangular pyramidal shape. The side edge of each quadrangular pyramid may be inclined from a virtual perpendicular line VL3 by a third angle $\theta 3$. In addition, the quadrangular pyramids may be spaced apart from each other by a predetermined distance d. The virtual perpendicular line VL3 may be normal to the surface of the lens 120 on which the pattern unit 130 is located. However, the disclosure is not limited thereto.

Illuminance on the target illuminance surface TL may be changed based on the shape of the pattern unit 130. For example, illuminance on the target illuminance surface TL may be changed based on the third angle $\theta 3$ and the distance d.

Figure 15:
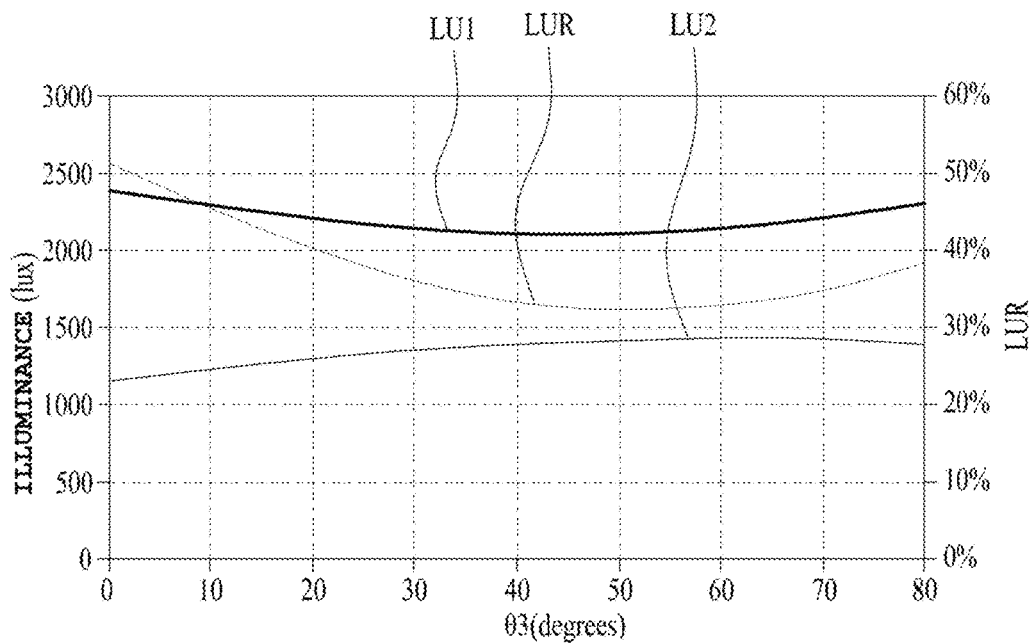
FIG. 15 is a graph showing the change of illuminance based on the change of a third angle in the pattern unit shown in FIG. 14.

FIG. 15 is a graph showing the change of illuminance based on the change of the third angle $\theta 3$ in the pattern unit 130 shown in FIG. 14. In FIG. 15, a horizontal axis indicates a third angle $\theta 3$, a left vertical axis indicates first illuminance LU1 on the first light beam exit area TLA1 and second illuminance LU2 on the second light beam exit area TLA2 of the lens 120 (120A or 120B), and a right vertical axis indicates an illuminance ratio LUR between the first illuminance LU1 and the second illuminance LU2 represented by the following Equation 1.

$$LUR = \frac{LU1 - LU2}{LU1} \quad \text{[Equation 1]}$$

Referring to FIG. 15, in a case in which an illuminance ratio LUR that cannot be easily perceive with the naked eye is 40% or less, the third angle θ3 may be 20 to 80 degrees. However, the disclosure is not limited thereto.

Figure 16:
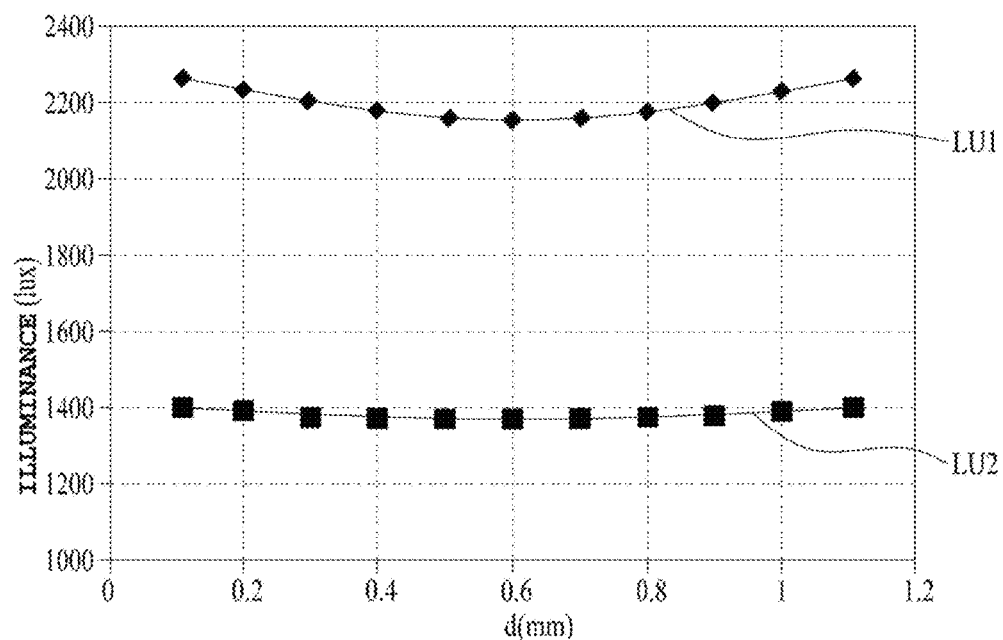
FIG. 16 is a graph showing the change of illuminance based on the distance between patterns of the pattern unit.

FIG. 16 is a graph showing the change of illuminance based on the distance d between patterns of the pattern unit 130. In FIG. 16, a horizontal axis indicates the distance d, and a vertical axis indicates the illuminance.

Referring to FIG. 16, the uniformity in illuminance between the first illuminance LU1 and the second illuminance LU2 is the highest at a distance d of 0.6 mm, at which the first illuminance LU1 is the lowest. In addition, when the distance d between cubic bodies is 0.1 mm to 1.1 mm, the change of illuminance is slight. Consequently, the distance d may be 0.1 mm to 1.1 mm. However, the disclosure is not limited thereto.

The light emitting device package according to each of the previous embodiments may be applied to various fields, such as a lighting apparatus, a display apparatus, and an indicator. For example, the lighting apparatus may include a lamp or a streetlight. In particular, the light emitting device package may be applied to a backlight unit.

Hereinafter, a backlight unit including the light emitting device package according to each of the previous embodiments will be described with reference to the accompanying drawings.

Figure 17:
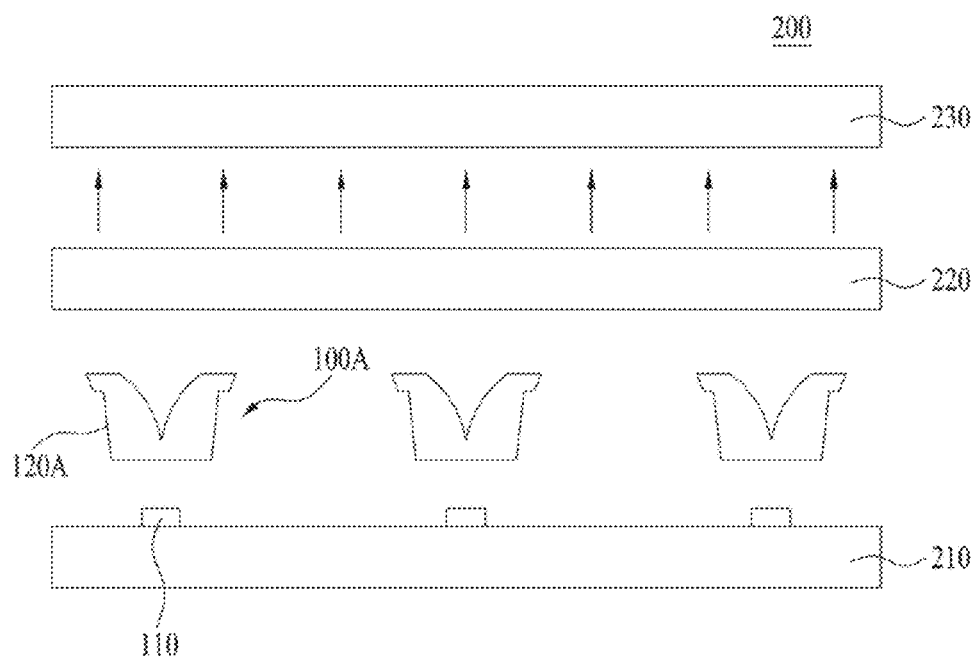
FIG. 17 is a sectional view showing a backlight unit according to an embodiment.

FIG. 17 is a sectional view showing a backlight unit 200 according to an embodiment.

The backlight unit 200 shown in FIG. 17 may include a board 210, a plurality of light emitting device packages 100A, a light guide plate 220, and an optical member 230.

In general, based on the position of a light source, the backlight unit may be classified as an edge type backlight unit or a direct type backlight unit. In the edge type backlight unit, the light source is located at the edge of the backlight unit. In the direct type backlight unit, the light source is located under the backlight unit. The backlight unit 200 shown in FIG. 17 is a direct type backlight unit, which may use a light emitting diode, from which Lambertian light is emitted, as a light source 110. In the direct type backlight unit, which is generally applied to display apparatuses larger than 20 inches, a plurality of light sources 110 is located under a panel. The direct type backlight unit exhibits higher light efficiency than the edge type backlight unit. For this reason, the direct type backlight unit may be mainly used for large-sized display apparatuses in which high luminance is critical.

Referring to FIG. 17, a plurality of light emitting device packages 100A may be mounted on a board (e.g. a printed circuit board) 210 in an array fashion.

An electrode pattern for connecting each light source 110 with an adaptor for supplying electric power may be formed on the board 210. For example, an electrode pattern for connecting each light source 110 with a corresponding adaptor may be formed on the upper surface of the board 210.

The board 210 may be a printed circuit board (PCB), made of polyethylene terephthalate (PET), glass, polycarbonate (PC), or silicon (Si). The board 210 may be formed to have a film shape.

In addition, a single-layer PCB, a multiple-layer PCB, a ceramic board, or a metal core PCB may be selectively used as the board 210.

The light guide plate 220 may serve to guide light emitted from the light emitting device packages 100A. For example, the light guide plate 220 may be made of at least one of an acrylic resin such as polymethyl methacrylate (PMMA), polyethylene terephthalate (PET), cycloolefin copolymer (COC), polyethylene naphthalate (PEN), polycarbonate (PC), polystyrene (PS), or methacrylate styrene (MS).

The optical member 230 may be located on the light guide plate 220. The optical member 230 may serve to diffuse light exiting through the light guide plate 220. In order to improve a diffusion effect, a concave and convex pattern may be formed on the upper surface of the optical member 230.

The optical member 230 may be formed to have a single layer or a plurality of layers. The concave and convex pattern may be formed on the uppermost layer or any one of the layers. The concave and convex pattern may be formed to have a stripe shape corresponding to the light sources 110.

According to circumstances, the optical member 230 may include at least one sheet. For example, the optical member 230 may selectively include a diffusion sheet, a prism sheet, and a luminance enhancement sheet. The diffusion sheet serves to diffuse light emitted from the light emitting device packages 100A. The prism sheet serves to guide the diffused light to a light emitting area. The luminance enhancement sheet serves to enhance luminance.

As is apparent from the above description, in a light emitting device package and a backlight unit including the same according to an embodiment, a pattern unit is located at the edge of the upper part of a lens, thereby achieving uniform illuminance (or luminance) on a target illuminance surface.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A light emitting device package, comprising:
a light source;
a lens located on the light source; and
a pattern unit located on the lens, wherein
the lens comprises:
a body having a first lower surface facing the light source;
a protrusion protruding from the body in a direction other than a direction of optical axis; and
a recess formed at a first upper surface of the body, the recess being located along the optical axis,
wherein the pattern unit is located outside the recess,
wherein the pattern unit is located on at least one selected from a portion of a surface of the protrusion and a first side surface of the body,
wherein the protrusion comprises:
a second upper surface located around the first upper surface;
a second lower surface opposite to the second upper surface; and
a second side surface located between the second upper surface and the second lower surface, and
wherein the pattern unit is located on at least one selected from the second upper surface, the first side surface, the second side surface, and the second lower surface.
2. The light emitting device package according to claim 1, wherein the recess has at least one selected from a curved surface and a flat surface.

3. The light emitting device package according to claim 1, wherein the recess is configured such that a sectional shape of the recess is symmetric with respect to the optical axis.

4. The light emitting device package according to claim 1, wherein the body of the lens further comprises a third upper surface located between the protrusion and the first upper surface.

5. The light emitting device package according to claim 4, wherein the pattern unit is located on at least one selected from the second upper surface, the third upper surface, the first side surface, the second side surface, the first lower surface, and the second lower surface.

6. The light emitting device package according to claim 1, wherein the pattern unit is located on at least a portion of the second upper surface.

7. The light emitting device package according to claim 1, wherein the pattern unit is integrally formed with the protrusion.

8. A light emitting device package, comprising:
   a light source;
   a lens located on the light source;
   a pattern unit located on the lens; and
   an adhesive unit,
   wherein the lens comprises:
      a body having a first lower surface facing the light source; and
      a protrusion protruding from the body in a direction other than a direction of optical axis, the adhesive unit bonding the pattern unit to the protrusion,
   wherein the pattern unit is located on at least one selected from a portion of a surface of the protrusion and a first side surface of the body, and
   wherein the pattern unit is formed separately from the protrusion.

9. The light emitting device package according to claim 1, wherein the lens is configured such that a sectional shape of the lens is symmetric with respect to the optical axis in a direction perpendicular to the optical axis.

10. The light emitting device package according to claim 1, wherein the pattern unit is spaced apart from the recess in a direction perpendicular to the optical axis.

11. The light emitting device package according to claim 1, wherein the pattern unit abuts on the recess in a direction perpendicular to the optical axis.

12. The light emitting device package according to claim 1, wherein the protrusion has a thickness greater than a width of the second lower surface.

13. The light emitting device package according to claim 1, wherein the pattern unit has at least one selected from a polyhedral shape, a composite cubic shape constituted by a plurality of polygons, a hemispherical shape, a roughness shape, and an irregular shape.

14. The light emitting device package according to claim 13, wherein the pattern unit has a pyramidal shape, the pyramidal shape having an angle of inclination of 20 degrees to 80 degrees.

15. The light emitting device package according to claim 13, wherein the pattern unit comprises a plurality of cubic bodies, spaced apart from each other by a distance of 0.1 mm to 1.1 mm.

16. A backlight unit, comprising:
   a light emitting device package according to claim 1; and
   an optical member located on the light emitting device package.

* * * * *